United States Patent

Wahl et al.

Patent Number: 5,767,964
Date of Patent: Jun. 16, 1998

[54] SLIDER FOR CALIBRATION AND CORRELATION OF FLYING HEIGHT TESTERS

[75] Inventors: Michael Wahl, San Diego; Samuel B. Shueh, Morgan Hill, both of Calif.

[73] Assignee: Phase Metrics, San Diego, Calif.

[21] Appl. No.: 812,424

[22] Filed: Mar. 7, 1997

[51] Int. Cl.$^6$ .................................................. G01J 1/02
[52] U.S. Cl. ..................................... 356/243; 356/357
[58] Field of Search ................................... 356/243, 357

[56] References Cited

U.S. PATENT DOCUMENTS

| | | | |
|---|---|---|---|
| 4,346,996 | 8/1982 | Miller | 356/243 |
| 4,624,564 | 11/1986 | Dahlgren | 356/243 |
| 4,998,194 | 3/1991 | Hara et al. | 356/243 |
| 5,220,408 | 6/1993 | Mager | 356/372 |
| 5,410,402 | 4/1995 | Li et al. | 356/243 |
| 5,453,831 | 9/1995 | Li et al. | 356/243 |

*Primary Examiner*—Frank G. Font
*Assistant Examiner*—Jason D. Vierra-Eisenberg
*Attorney, Agent, or Firm*—Blakely Sokoloff Taylor & Zafman

[57] ABSTRACT

A method for calibration and correlation of flying height testers with a calibration slider. The calibration slider has an air bearing surface that contains a flat portion and a sloped portion. To verify accuracy and correlation between flying height testers, the calibration slider is loaded adjacent to a rotating transparent disk of a tester. The slider is separated from the disk by an air film and flies at a zero pitch angle. Zero pitch angle can be attained by adjusting the rotational speed of the disk. The flying height tester includes an optical system which can measure the air film with a light beam that is directed through the disk and reflected from the slider.

10 Claims, 3 Drawing Sheets

SLIDER FOR CALIBRATION AND CORRELATION OF FLYING HEIGHT TESTERS

BACKGROUND OF THE INVENTION

1. Field of the Invention

The present invention relates to a calibration slider and a method for calibrating a flying height tester which measures film thickness of an air bearing surface of a head gimbal assembly (HGA) and a rotating disk. This thickness determines the spacing of magnetic flying head.

2. Description of Related Art

Disk drives contain magnetic recording heads containing transducers which store and retrieve information from a rotating rigid or flexible media(s). Each magnetic head is integrated into a slider which has an air bearing surface that cooperates with the air flow generated by the rotating disk to provide an air bearing film between the head and the surface of the disk. The air bearing prevents mechanical wear between the read/write transducer and the magnetic films on the disk.

It is desirable to minimize the spacings of the air bearing and disk to produce maximum electrical output between the head transducers and the magnetic media. Sliders are therefore designed to create an air cushion effect which has a minimum thickness and a maximum thickness. To insure flying height excursion compliance with such design criteria the recording heads are typically tested in an apparatus commonly referred to as an optical flying height tester.

Flying height testers include a loader mechanism that places a slider adjacent to a bottom surface of a rotating transparent disk. The slider is separated from the rotating disk by an air bearing surface (ABS). The tester also contains an optical system which directs a light beam through the transparent disk and onto the slider. The light is reflected from the slider onto a photo-diode detector assembly. The reflected light beam is analyzed to compute the thickness of the air bearing on the smooth glass surface.

It is desirable to have the means for verifying the accuracy of flying height measurements and correlating flying height testers. Even though an in-situ calibration routine is part of each flying height measurement, there are sources of error in the measurement results that need to be kept below a certain limit in order to qualify a flying height tester for sale. These measurement errors are monitored by performing (a) statistical tests (gage capability) and (b) correlation tests to a gold-standard tester and (c) a test that insures that the flying height changes with linear disk velocity as a single-valued, smooth function (strictly monotonous function). Test (c) is currently the most stringent test. However, experience shows that test (c) is dependent on many external conditions—not just the performance of the tester. Test (c) depends in particular on the type of slider used and thus, test (c) is not very reliable nor is test (c) truly objective. (In other words, if test (c) fails, the reason for failure might not necessarily be a problem with the tester).

The curve of test (c) is typically a nonlinear function which must be processed and analyzed using complex algorithms. Additionally, the processed curve can sometimes provide unreliable results. It would be desirable to provide a test standard for a flying height tester that is relatively simple and reliable. It would also be desirable to provide a test standard which can become an industry standard.

SUMMARY OF THE INVENTION

The present invention is a method for calibration and correlation of flying height testers with a calibration slider. The calibration slider has an air bearing surface that contains a flat portion and a sloped portion. To verify accuracy and correlation between flying height testers, the calibration slider is loaded adjacent to a rotating transparent disk of a tester. The slider is separated from the disk by an air film and flies at a zero pitch angle. Zero pitch angle can be attained by adjusting the rotational speed of the disk. The flying height tester includes an optical system which can measure the air film with a light beam that is directed through the disk and reflected from the slider. The calibration routine is performed by initially measuring the air gap thicknesses between the disk and at least two points along the flat portion toward the trailing edge of the slider to verify that the slider is flying at a zero pitch angle. The optical system then measures the air gap thicknesses between the disk and a plurality of points on the ramped portion of the slider. The ramped portion provides a number of data points which can be plotted on a graph. The curve should be linear which greatly simplifies the analysis of the flying height calibration. The plotted air gap measurements can be compared with a pre-measured surface profile of the sloped portion of the slider to determine the accuracy of the tester. The degree of agreement between these two measurements indicates the accuracy and/or consistency of the flying height tester.

DETAILED DESCRIPTION OF THE INVENTION

Figure 1:
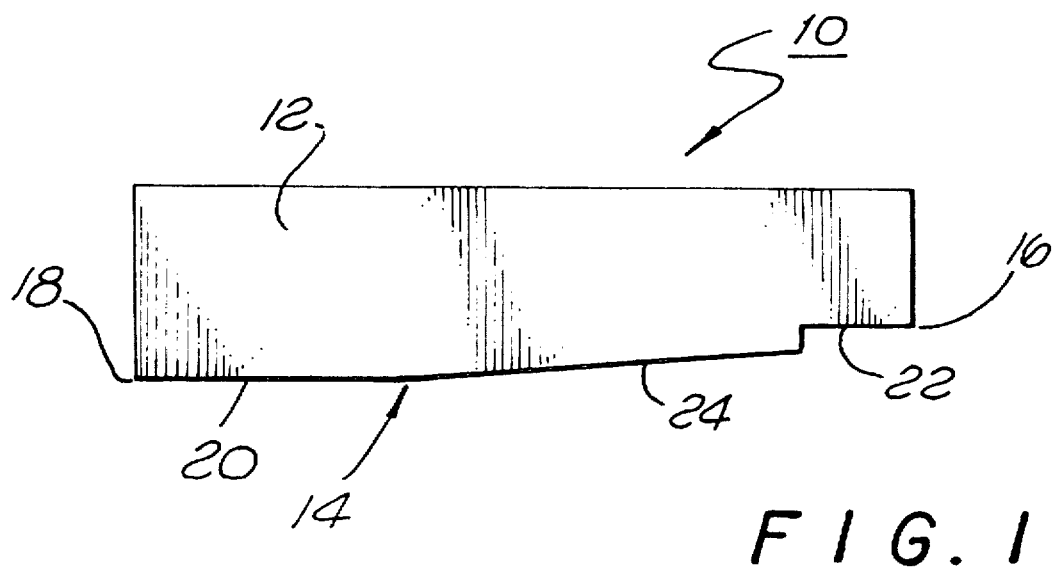
FIG. 1 is a side view of a calibration slider of the present invention.
Figure 2:
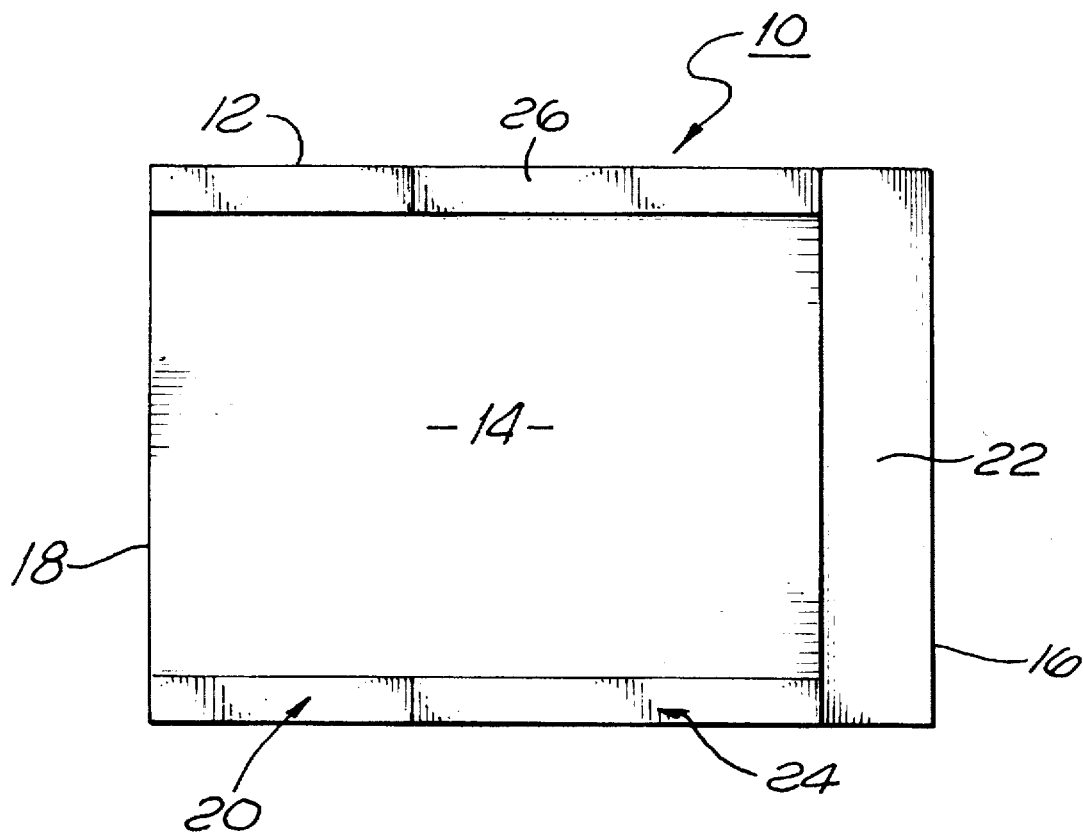
FIG. 2 is a bottom view of the calibration slider.

Referring to the drawings more particularly by reference numbers, FIGS. 1 and 2 show a calibration slider 10 of the present invention. The slider 10 includes a substrate 12 which has an air bearing surface 14. The air bearing surface 14 has a leading edge 16 and a trailing edge 18. The trailing edge 18 of the air bearing surface 14 has a flat portion 20. The leading edge 16 has a stepped portion 22. The step is used to allow airflow entrainment to provide an air cushion effect.

The air bearing surface 14 also has a sloped portion 24. The sloped portion 24 preferably has a linear slope which has a minimum ramp angle of 400 micro-radians. In the preferred embodiment, the sloped portion 24 has a length of 0.042 inches and a depth of 0.00002 inches. The stepped portion 22 preferably has a depth of 0.00004 inches. Although a stepped portion 22 is shown and described, it is to be understood that other distinguished features which create a high pressure gradient at the leading edge 16 of the slider 10 may be employed. The stepped portion 22 is a configuration that allows transition from a sloped surface to a standout. It employs an etching process rather than a machining step. The sloped portion 24 is preferably located on a pair of rails 26 that extend along opposite sides of the slider 10. The rails 26 preferably have a width of 0.01 inches. The slider preferably has the dimensions of 0.08 by 0.063 by 0.017 inches. The flat portion 20 preferably has a length of 0.03 inches. Although specific dimensions are disclosed, it is to be understood that the slider may have other dimensions.

Figure 3:
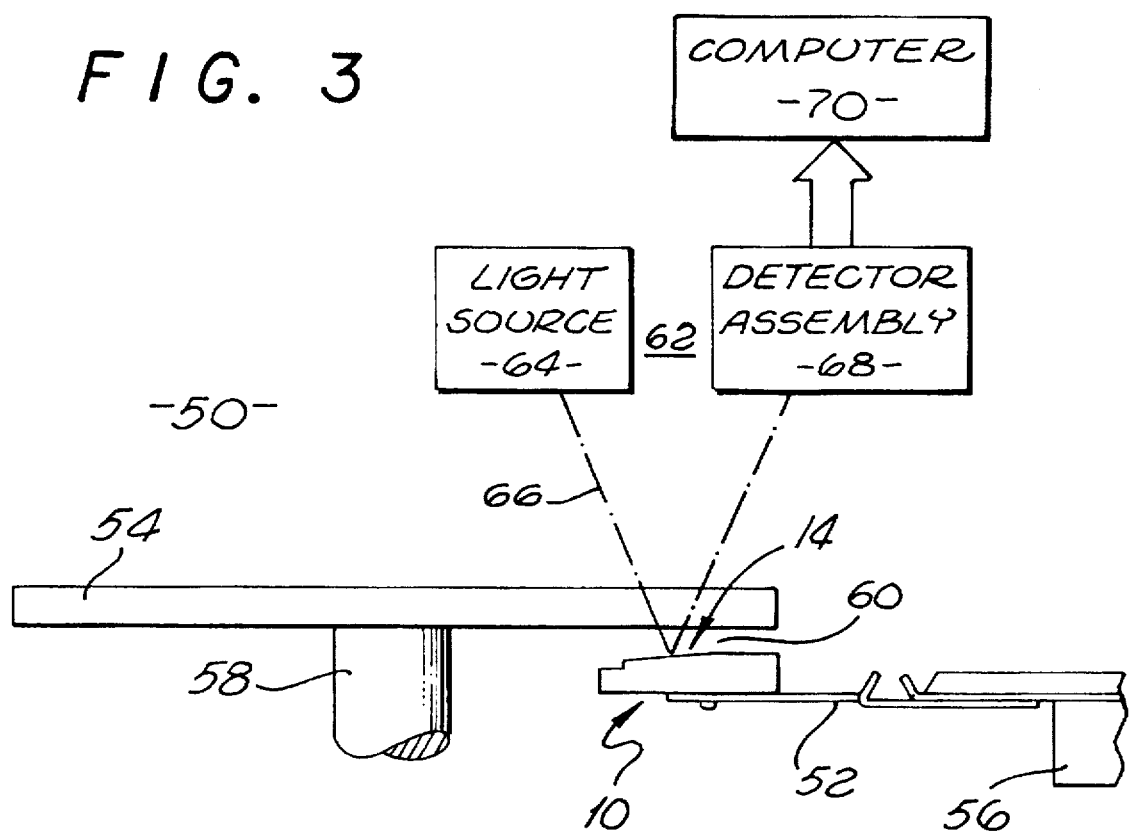
FIG. 3 is a schematic of the calibration slider installed into a flying height tester HGA fixture.
Figure 4:
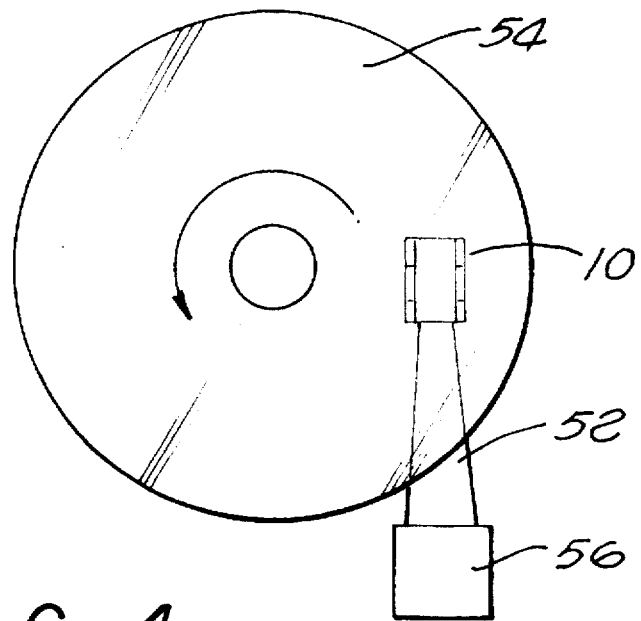
FIG. 4 is a top view showing the calibration slider loaded onto a disk of a flying height tester.

As shown in FIGS. 3 and 4, the calibration slider 10 is typically loaded into a flying height tester 50 to calibrate the tester 50. The flying height tester 50 may be an apparatus sold by Phase Metrics of San Diego, California, the assignee of the present invention. The calibration slider 10 is typically assembled to the gimbal of a flexure arm 52 to create a structure commonly referred to as a head gimbal assembly (HGA). The gimbal allows the slider 10 to pivot about the flexure arm 52. The pivot point is preferably located 0.023 inches from the trailing edge 18 of the slider 10 to maintain proper leveling. The flexure arm 52 preferably has a preload of 5 grams-force.

The slider 10 is loaded adjacent to a transparent disk 54 by a loader mechanism 56. The disk 54 is rotated by a spindle motor 58. The air flow created by the rotating disk 54 and the hydrodynamic features of the slider air bearing surface 14 create an air film 60 between the slider 10 and the disk 54.

The flying height tester 50 includes an optical system 62 which measures the thickness of the air film 60 between the disk 54 and the slider 10. The optical system 62 includes a light source 64 which directs a light beam 66 through the transparent disk 54 and onto the slider 10. The light is reflected from the slider 10 onto a photo-detector assembly 68. The detector assembly 68 is coupled to a processor 70 that can compute the thickness of the air film 60. The optical system 62 typically computes the air film thickness by detecting and analyzing an interference pattern(s) created by light reflected from both the disk 54 and the slider 10. The detector assembly 68 contains means to measure different points on the slider 10.

The performance of the flying height tester 50 is analyzed by initially loading the calibration slider 10 onto the disk 54. The slider 10 is separated from the disk 54 by the air film 60. The speed of the disk 54 is set so that the slider 10 flies at an essentially zero pitch angle. At a zero pitch angle the flat portion 20 of the slider 10 is essentially parallel with the surface of the disk 54. The optical system 62 then measures the air film thicknesses between the disk 54 and at least two points of the flat portion 20. The slider 10 is flying at a zero pitch if the two measured air gap thicknesses are equal. This approach requires only that the measurements are repeatable. This does not make any assumption about the accuracy of the flying height tester. If the air gaps are not equal the disk speed is varied and the air gap thicknesses associated with at least two points on the flat portion 20 are again measured.

The optical system 62 then measures the air gap thicknesses between the disk 54 and a plurality of points on the sloped portion 24. The thickness of the air gap at the flat portion 20 is then subtracted from the air gaps measured in the ramped portion 24 to obtain a measured profile of the ramped portion 24. The actual profile of the ramped portion 24 is measured with a stylus profilometer or other means to obtain the true profile of the air bearing surface 14.

Figure 5:
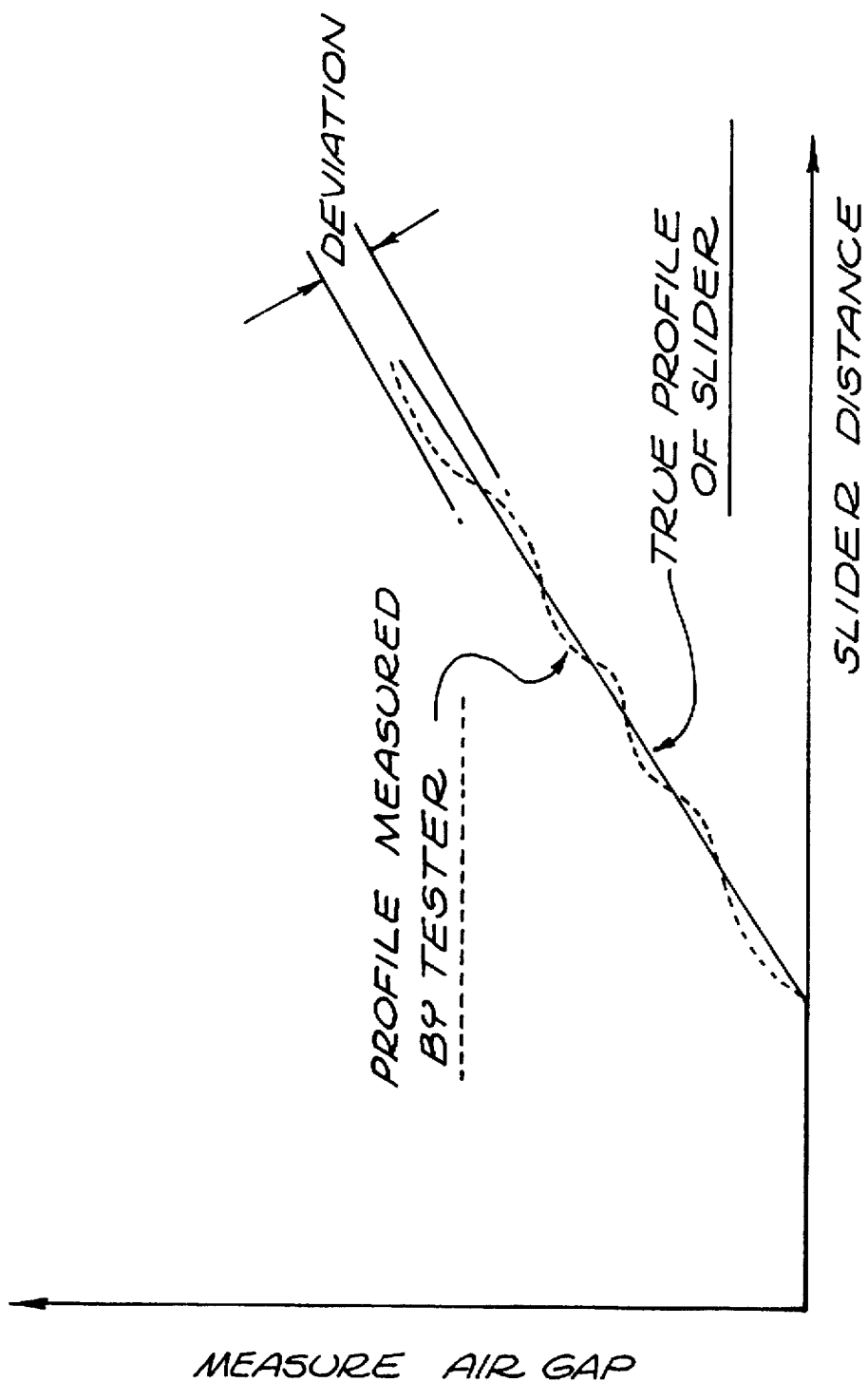
FIG. 5 is a graph showing the measured air gap within the flying height tester versus a measured profile of the calibration slider.

As shown in FIG. 5, the profile of the sloped portion 24 as measured by the flying height tester 50 is compared to the true profile measured by the profilometer. The profile measured by the tester should directly correlate to the true profile of the ramped portion 24. Any deviation will be indicative of an error in the flying height tester. The present invention provides a direct correlation between a calibrated mechanical means with optical measurement. This provides an easier means to analyze the calibration curves of test (c) from above of the prior art. The relative simplicity of analysis provides a technique that is an excellent candidate for an industry standard.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A slider for calibration and correlation of a tester that measures an air gap, comprising:

a substrate which has an air bearing surface that has a flat portion and a sloped portion.

2. The slider as recited in claim 1, wherein said air bearing surface includes a stepped portion.

3. The slider as recited in claim 1, wherein said sloped portion has a linear slope.

4. An apparatus that measures an air film thickness, comprising:

a disk;

a spindle motor that rotates said disk;

a calibration slider that is separated from said disk by an air gap, said calibration slider having an air bearing surface that has a flat portion and a sloped portion; and, an optical system that measures the air gap with a light beam that is directed through said disk and reflected from said calibration slider.

5. The apparatus as recited in claim 4, wherein said air bearing surface of said calibration slider includes a stepped portion.

6. The apparatus as recited in claim 4, wherein said sloped portion has a linear slope.

7. A method for verifying the accuracy and correlation of an apparatus that measures an air gap, comprising the steps of:

a) placing a calibration slider adjacent to a rotating disk so that said calibration slider is separated from said disk by an air gap that has a plurality of thicknesses, wherein said calibration slider has a flat portion and a sloped portion;

b) measuring the air gap thicknesses between said disk and at least two points on said flat portion of said calibration slider; and, c) measuring the air gap thicknesses between said disk and a plurality of points on said sloped portion of said calibration slider.

8. The method as recited in claim 7, wherein said disk rotation is varied so that the air gap thicknesses between said disk and the two points on said flat portion of said calibration slider are approximately equal.

9. The method as recited in claim 7, further comprising the step of measuring a surface profile of said flat and sloped portions of said calibration slider.

10. The method as recited in claim 9, further comprising the step of comparing the measured surface profile with the measured air gaps thickness.

* * * * *